May 12, 1970     R. C. MILLER     3,511,379
DIRT TRAP
Filed March 27, 1967
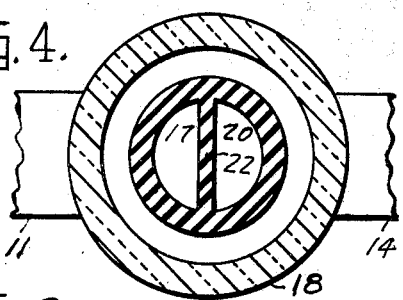
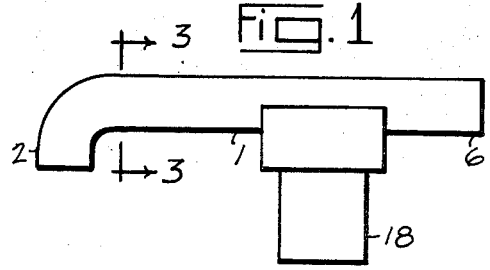
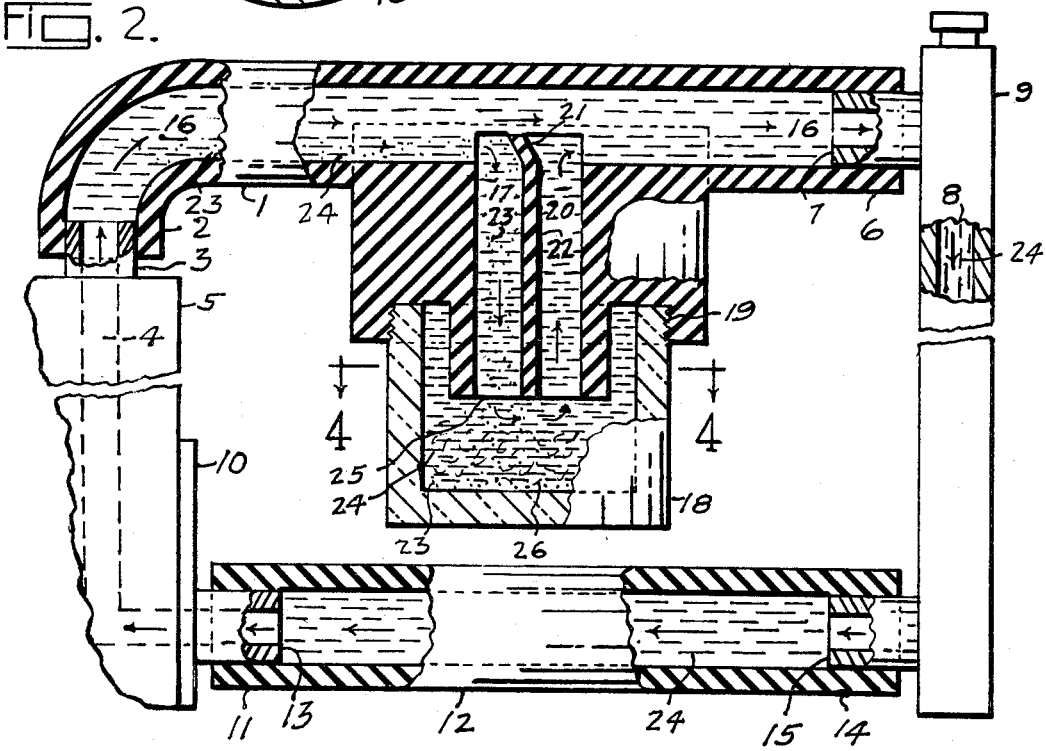
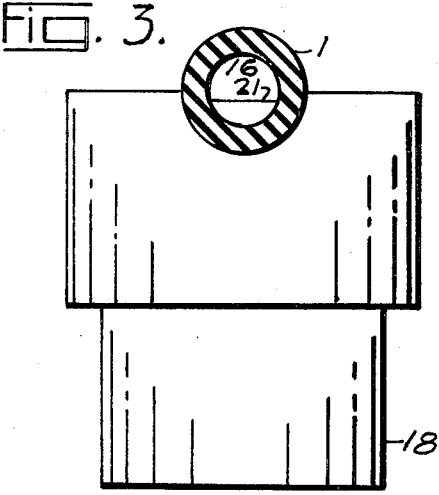
INVENTOR.
RAYMOND C. MILLER
BY William B. Linnear
ATTORNEY United States Patent Office 3,511,379
Patented May 12, 1970

3,511,379
DIRT TRAP
Raymond C. Miller, 3349—25th St.,
Port Arthur, Tex. 77640
Filed Mar. 27, 1967, Ser. No. 626,667
Int. Cl. B01d 21/02
U.S. Cl. 210—194                                    2 Claims

ABSTRACT OF THE DISCLOSURE

The invention discloses a dirt trap structure which is particularly adapted for use in connection with diverting, separating, catching and retaining unwanted foreign matter such as fragments of materials such as dirt, sand, iron scale and the like, as well as grease or oils that get into the liquid or coolant in a circulating system which liquid or coolant is forced under pressure by means of a pump from the water jacket or hollow liquid chamber surrounding the cylinders in the block of an internal combustion motor or the like and said liquid circulated under pressure through a conduit with the lower portion of the liquid encountering baffle diverting means extending upwardly through hole in the bottom of said conduit to divert the lower portion of the liquid and foreign matter therein and direct the same downwardly into a trap comprising a hollow bowl with retaining means therein to separate, catch and retain the foreign matter in retaining means in said bowl and allow the diverted portion of the liquid which has been cleaned of the foreign matter to be forced and returned upwardly into the main stream of the liquid passing over the baffle through the passageway in the conduit and through the outlet into a radiator to be cooled and forced downwardly through said radiator through the bottom thereof and thence through connecting conduit to the bottom of the water jacket in the block of the motor in a continuous circulating stream of clean liquid to cool the motor block and working parts therein to prevent the motor from overheating.

This invention relates to new and useful improvements in a trap for catching and retaining foreign matter entrained in liquids in a liquid circulating system, such as employed in fluid or liquid cooling systems of internal combustion motors and the like.

An object of the invention is to provide a trap of the character described preferably located in the top conduit or as an attachment thereto which connects the top of the hollow water chamber in the block of a motor to the top of the tank of a radiator so that the foreign matter entrained in the circulating water or other liquid coolant can be caught and retained in the trap prior to said foreign matter entering the radiator so as to keep the interior small conduits in the radiator from being clogged with said foreign matter adhering to the interior thereof which if allowed to collect therein greatly impairs the cooling efficiency of the radiator unless the water or coolant is cleansed before being circulated and before the same is cooled and returned to cool the block of the motor when circulated through the water chamber thereof.

Another object of the invention is to provide a trap of the character described whereby the volume of the circulating water or liquid coolant is not greatly reduced in order that approximately the same volume capacity of water or liquid coolant can be circulated from the water chamber of the block of a motor through the radiator and be returned through the water chamber in a cleaned and cooled condition preparatory for a repetition of continuously trapping and retaining the foreign matter present in the water or coolant by means of the trap in combination with a liquid circulating system used in connection with internal combustion motors or the like.

A further object of the invention is to provide a trap of the character described whereby the speed of the circulating water or liquid coolant is not greatly diminished which flows past said trap in combination with a liquid circulating system used in connection with internal combustion motors or the like.

A still further object of the invention is to provide a trap of the character described whereby diverting means is located in the passageway of the circulating liquid to divert the lower bottom portion of liquid and entrained foreign matter therewith to flow into said trap and the foreign matter be caught and retained and allow the liquid cleansed of the foreign matter to flow back into said passageway into a radiator for cooling the liquid and thence through the water chamber of the block of a motor.

These and other objects of the invention will in part be obvious and will in part be more fully disclosed in the specification, one embodiment of which is illustrated in the drawings, in which:

FIG. 1 is a side view in elevation of the trap;

FIG. 2 is an enlarged view, partly sectional showing the trap as a part of the top conduit which connects the top of the water chamber of a motor to the top of the tank of a radiator and a bottom conduit connecting the bottom portion of the radiator tank to the bottom of the water chamber of the motor;

FIG. 3 is an end view, partly sectional, taken on the line 3—3 of FIG. 1; and

FIG. 4 is a sectional view taken on the line 4—4 of FIG. 2.

The invention will be better understood from a more detailed description thereof reference being had to the accompanying drawings in which like numeraled parts therein in the various views denote like numeraled parts herein.

The numeral 1 denotes a hollow rubber conduit body the lower end 2 of which is curved and fitted over a discharge pipe 3 which communicates with the hollow water chamber 4 of the block 5 of a motor. The water chamber 4 surrounds the cylinders of the block 5 such as in internal combustion motors or the like. The upper end 6 of the conduit body 1 is fitted over the intake pipe 7 at or near the top of the tank 8 of the radiator 9 into which tank 8 circulating water or liquid coolant is forced by the water pump 10 located in the front end of the block 5 of the motor. The rear end 11 of the bottom rubber hose or conduit 12 is fitted over intake pipe 13 communicating with the interior of the hollow water chamber 4 of the block 5 and the forward end 14 of the hose 12 fitted over the discharge pipe 15 which is in communication with the bottom hollow interior of said tank 8 of the radiator 9.

The hollow rubber conduit body 1 has a liquid passageway 16 extending therethrough and leading outwardly and downwardly therefrom is a liquid inlet channel 17 which extends downwardly into and communicates with the interior of a glass bowl 18 as a depository for foreign matter, which bowl 18 is threadedly screwed into threaded depending portion 19 of the body 1 as shown in FIG. 2 of the drawings. An upwardly extending discharge outlet channel 20 parallels the inlet channel 17 and extends upwardly into passageway 16 from the interior of said glass bowl 18 with which it communicates. Diverting means such as rearwardly inclined baffle plate 21 extends a short distance up into passageway 16 from the dividing wall 22 which separates inlet channel 17 from an outlet discharge channel 20. The baffle plate 21 diverts the flow of the liquid 24 travelling along the bottom portion of the passageway 16 carrying with it a great portion of the foreign matter indicated at 23 since it is generally heavier than water 24 and falls out of solution to the bottom of said passageway 16 when deterred and diverted by baffle plate 21 which extends across the bottom of the passageway 16 of the conduit body 1. The upper end of said outlet discharge channel 20 will discharge the liquid 24 flowing from passageway 16 into inlet channel 17 and thence up through discharge outlet channel 20 back into said passageway 16 to discharge forward of the point of entry of the liquid 24 flowing from passageway 16 into inlet channel 17 as indicated by the direction of the arrows shown in said passageway 16 and channels 17 and 20 in FIG. 2 of the drawings. The foreign matter 23 will drop out of solution from the water 24 when it passes through the lower end 25 of inlet channel 16 and becomes trapped in the fibres 26 which are enclosed within the bottom interior of said glass bowl 18. Likewise oil or grease and the like which is in the water or liquid coolant 24 as it flows through the lower end 25 of inlet channel 16 will cling to the fibres 26 so that the water flowing into bowl 18 will be cleansed. The cleaned water will then flow up through outlet discharge channel 20 and thence into the passageway 16 and into the radiator 9 to be cooled and circulated through bottom conduit hose 12 into the water chamber 4 of the block 5 of the motor to cool the motor. The direction of the flow of water 24 is indicated by the arrows in the radiator 9 and bottom hose 12 and water chamber 4 of the motor block 5 as shown in FIG. 2 of the drawings.

In the operation of the trap in combination with a liquid circulating system as disclosed herein makes it possible to trap and retain the foreign matter which accumulates in the liquid circulating system of internal combustion motors and the like and thus continuously cleanses the liquid of such objectionable foreign matter as the liquid circulates through passageway 16, thence inlet channel 16, thence interiorily into bowl 18 and thence up through outlet discharge channel 20 and back into passageway 16. Thus the buildup of the foreign matter which presently occurs interiorly in the conduits in the radiators and the water chamber of the motor blocks is eliminated by the use of the present invention in combination therewith which will greatly increase the life of the motor and radiator. The small pipes in the common radiator conventionally used in connection with motors become clogged interiorly with the foreign matter to greatly diminish the capacity of the radiator to cool the water or coolant used in the circulating system thereof thus restricting the flow of cooled water or coolant to be circulated through the water chamber of the block of the motors. Also the foreign matter in water and liquid coolants without the use of the present invention in combination with radiators and motors and liquid circulating systems thereof causes the water chamber walls surrounding the cylinders in the block of the motors to become caked with foreign matter adhering to its inner walls thereby causing the motors to overheat to the extent that the the usefulness of the motors are greatly diminished. However, with the use of the present invention in combination with the liquid system employed in such motors and the like the life of said motors and the working parts thereof are greatly increased since over heating causes undue wear by friction of the pistons working in the cylinders of the motor block, as well as, other working parts affected all of which depend upon the cooling system to circulate clean liquids to prevent it. Wear from over heating is prevented by providing the present invention to trap and retain the foreign matter continuously from the circulating liquid and to prevent undue amounts from entering the radiator and then passing into the water chamber of the motor block.

It is obvious that many changes may be made in the details of construction and arrangement of the parts of the trap without departing from the scope and spirit of the invention.

What I claim as new and desire to secure by Letters Patent, is:

1. A trap for catching and retaining foreign matter entrained in liquid in a liquid circulating system including a conduit body in combination with said circulating system and having a liquid passageway extending therethrough and an inlet and outlet channel in said conduit body in communication with said passageway and in communication with a hollow bowl for catching and retaining foreign matter entrained in liquid entering said bowl, a baffle plate means extending into said passageway positioned to divert the lower portion of the liquid and foreign matter flowing through said passageway into said inlet channel under pressure for constant deposition of the foreign matter into said hollow bowl but not restricting flow of the upper portion of said liquid, said outlet channel positioned with respect to the said inlet channel to carry the liquid free of the foreign matter from said bowl into said passageway forward of the point where the liquid and entrained foreign matter enter said inlet channel.

2. A trap for catching said retaining foreign matter entrained in liquid in a liquid circulating system including a conduit body in combination with said circulating system and having a liquid passageway extending therethrough and an inlet and outlet channel in said conduit body in communication with said passageway and in communication with a hollow bowl for catching and retaining foreign matter entrained in liquid entering said bowl, a baffle plate means extending upwardly into said passageway positioned to divert the lower portion of the liquid and foreign matter flowing through said passageway into said inlet channel under pressure for constant deposition of the foreign matter into said hollow bowl but not restricting flow of the upper portion of said liquid, said outlet channel positioned with respect to the said inlet channel to carry the liquid free of the foreign matter from said bowl into said passageway forward of the point where the liquid and entrained foreign matter enter said inlet channel.

References Cited

UNITED STATES PATENTS

| 1,101,574 | 6/1914 | Shephard | 210—532 X |
| 1,421,658 | 7/1922 | Bateman | 210—532 |
| 2,121,538 | 6/1938 | Farmer. | |
| 2,467,547 | 4/1949 | Bianbaum | 210—532 |
| 2,582,880 | 1/1952 | Mikulic | 210—532 X |
| 2,692,086 | 10/1954 | Butler | 210—532 X |
| 3,168,466 | 2/1965 | Milne | 210—532 X |
| 3,362,536 | 1/1968 | Sellman | 210—532 X |

JOHN W. ADEE, Primary Examiner

U.S. Cl. X.R.

210—532